United States Patent [19]

Smith et al.

[11] 3,941,896

[45] Mar. 2, 1976

[54] NOVEL NITROGEN AND PHOSPHORUS-CONTAINING SALTS

[75] Inventors: Raymond Anthony Smith, Walsall; Ralph Thomas Russell, Brierley Hill, both of England

[73] Assignee: Albright & Wilson Limited, Oldbury near Birmingham, England

[22] Filed: Nov. 8, 1973

[21] Appl. No.: 413,972

Related U.S. Application Data

[63] Continuation of Ser. No. 853,215, Aug. 26, 1969, abandoned.

[30] Foreign Application Priority Data

Sept. 4, 1968 United Kingdom............... 42066/68

[52] U.S. Cl.................................. 423/306; 423/315
[51] Int. Cl.²................... C01B 15/16; C01B 25/26
[58] Field of Search................... 423/306, 307, 315

[56] References Cited

UNITED STATES PATENTS

| | | | |
|---|---|---|---|
| 3,048,471 | 8/1962 | Shaver | 423/305 |
| 3,397,035 | 8/1968 | Shen et al. | 423/307 |
| 3,397,947 | 8/1968 | Shaver | 423/275 |
| 3,457,177 | 7/1969 | Kowalski et al. | 252/8.1 |

*Primary Examiner*—Oscar R. Vertiz
*Assistant Examiner*—Gregory A. Heller
*Attorney, Agent, or Firm*—Flynn & Frishauf

[57] ABSTRACT

Modified ammonium polyphosphates which are water-soluble and contain at least one radical selected from the group consisting of borate, sulphate, sulphite, and phosphite produced by admixing component (i) an organic ammoniating and condensing agent, component (ii) a phosphoric acid, the molar proportion of said component (i) to said component (ii) based on the $P_2O_5$ content in said component (ii), being from 1.3:1 to 3:1, and component (iii) a compound selected from sulphuric acid, boric acid, boric oxide, phosphorous acid, sulphurous acid and the sodium potassium, calcium, urea and ammonium salts of said compound, the proportion of said component (iii) being from 2 to 1/10 moles per mole of $P_2O_5$ in the admixture; and heating until a self-sustaining exothermic reaction occurs whereby said three components react and form said water-soluble modified ammonium polyphosphates. The process of preparing said polyphosphates is also claimed.

27 Claims, No Drawings

NOVEL NITROGEN AND PHOSPHORUS-CONTAINING SALTS

This application is a continuation application of application Ser. No. 853,215 filed Aug. 26, 1969 now abandoned.

The present invention relates to novel nitrogen- and phosphorus-containing salts which have a wide variety of potential uses for example as sequestrants, threshold agents, dispersants, corrosion retarders, fertilisers, and in fire retardant compositions.

It is known to prepare complex polyphosphate salts by the exothermic reaction of an organonitrogen compound, usually urea or thiourea, with a phosphoric or polyphosphoric acid (see, for example, Kogyo Kagaku Zasshi 1963 66(5) 586, and BP 1,074,243).

Customarily the product of the aforesaid reaction is referred to as ammonium polyphosphate. "Ammonium polyphosphate" will accordingly be used herein to describe the reaction product of organonitrogen compound with phosphoric or polyphosphoric acids or $P_2O_5$ at elevated temperatures, notwithstanding that at least part of the nitrogen may be present in combined forms other than $(NH_4)^+$ e.g. as $P-NH_2$ or $P-NH-P$ groups. Similarly "ammonium" will be used to include nitrogen in any other such combined forms as may be present in the aforesaid ammonium polyphosphates. "Phosphatic units" is used herein to include groups of the formula

and also groups such as

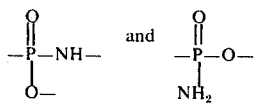

"Polyphosphate" herein designates any compound or mixture consisting essentially of chains containing an average of more than two phosphatic units of the fragmental formula:

with, possibly, a minor proportion of

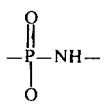

and

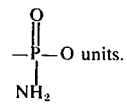

Ammonium polyphosphates tend to decrease in water solubility as the $P_2O_5$ content increases (corresponding to increasing average length of the polyphosphate chains). This diminished solubility is a disadvantage in many potential applications. We have now discovered a class of modified ammonium polyphosphates which exhibit improved solubility together with such desirable characteristics as sequestrant, threshold and dispersant activity, and fire retardance. Moreover certain of our modified ammonium polyphosphates may be heated to provide insoluble fire retardants with improved retention of ammonia compared with prior art ammonium polyphosphate fire retardants.

Our invention provides ammonium polyphosphates as herein defined modified by the inclusion in the chains thereof of non-phosphatic units in a proportion of phosphatic to non-phosphatic units from 1:1 to 100:1 and preferably 1:1 to 20:1. Preferably the non-phosphatic units are derived from oxyanions of boron or sulphur, or from sulphamate, phosphite, thiophosphite or organophosphonate anions. Particularly preferred non-phosphatic units are those condensed from sulphate, borate, sulphite, and phosphite.

The modified salts of our invention preferably contain from 40 to 70% by weight of $P_2O_5$. Preferably the nitrogen to phosphorus atomic ratio is from 1.3:1 to 2.5:1, e.g. from 1.6:1 to 2.0:1.

The salts of our invention may be further modified by inclusion therein of a minor molar proportion of alkali and/or alkaline earth metal cations based on the proportion of nitrogen. The preferred units for inclusion in the chains of ammonium polyphosphates of our invention are sulphate, sulphite, borate and phosphite. Other units include sulphamate, hydroxyalkyl diphosphonate and aminoalkylene phosphonate groups.

The preferred compounds of our invention are thus believed to be chains constructed from the following units:-

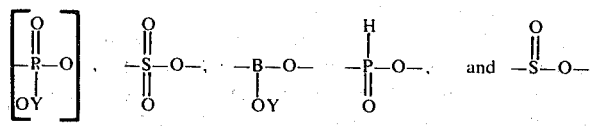

where each Y may be $NH_4$, a metal, or hydrogen, the major part of the Y groups being $NH_4$. The preferred compounds may also contain some groups of the formula

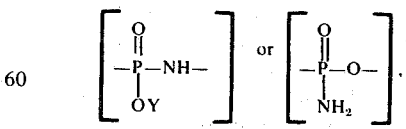

as well as chain branches at groups such as

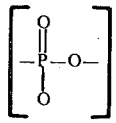

and

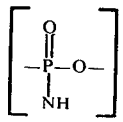

and water of crystallisation.

To summarise, the preferred compounds of the invention may be represented by the formula:

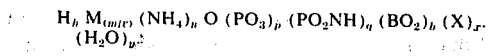

wherein M is sodium, potassium, or calcium, X is $-SO_3-$, $-SO_2-$ or $-PO_2-$, $v$ is the valency of M, and $h,m,n,p,q,b,x$ and $y$ are all numbers from 0 to 20 such that: $p>2$; $(h+m+n) = (p+q+b+2)$; $n>m$; $(p+q)/(b+x)$ is from 1 to 20; and $m+n>h$. Preferably $(n+q)/(p+q)$ is from 1.3 to 2.5. In practice the products of our invention are usually mixtures of compounds having the above formula, together sometimes with minor proportions of $NH_4OH$, $M(OH)_v$, and/or traces of sulphates, borates, orthophosphates and or pyrophosphates as impurities. Products of our invention may also contain minor proportions of ring compounds which have the above formula except that $(h+m+n+2r) = (p+q+b+2)$ where $r$ is the number of complete rings per molecule.

Two particular types of composition may be distinguished. In the first $(p+q)/(b+x)$ is from 20 to 4, e.g. 8: such compositions have been found of particular value as sequestrants, dispersants, corrosion inhibitors, and for threshold treatment to inhibit scale formation. The second type of composition has $(p+q)/(b+x)$ between 4 and 1 and is of particular value in liquid fertilisers and in fire extinguishing liquids. It is particularly preferred to use modified ammonium polyphosphates of our invention in conjunction with urea in the formulation of liquid fertilisers. The combination synergistically improves the concentration of fertiliser ingredients which can be obtained in the liquid. Ammonium polyphosphates modified in accordance with our invention by incorporation therein of phosphite units are of particular value as antioxidants for rubber, and in the treatment of boiler water. Incorporation of sulphite, phosphite, or borate units has a further advantage in that these groups have been found to reduce the formation of cyanuric acid, which is usually formed as an undesirable by-product when urea is reacted with polyphosphoric acids.

In general it is preferred to incorporate only one type of modifying unit in a given product. Mixtures of compatible modifying units may, however sometimes be advantageous. In general we have found that sulphite is not readily compatible with phosphite, and these two modifying units are preferably not used in conjunction.

Other uses of the novel ammonium polyphosphates include uses as replacements for potassium pyrophosphate in liquid heavy duty detergents including wax cleaning polishes and as detergent builders. The aforesaid uses of modified ammonium polyphosphates are further aspects of our invention.

The water soluble ammonium polyphosphates of our invention may be heat cured to provide relatively insoluble ammonium polyphosphates which are of value as fire retardants in emulsion paints and powder fire extinguishers. The ammonium content of such fire retardants is an important property. We have found that when soluble ammonium polyphosphates of our invention are heat cured they lose less ammonia than do unmodified polyphosphates of the prior art.

The invention further provides a method of preparing modified ammonium polyphosphates which comprises mixing: (A) thiourea or, preferably, urea; (B) phosphoric or polyphosphoric acid containing up to 85% $P_2O_5$ or a suspension of $P_2O_5$ in polyphosphoric acid or an acid phosphate; (C) boric acid, boric oxide, a borate, a perborate, a pyroborate, sulphuric acid, a sulphate, a sulphite, phosphorous acid, a phosphite, a thiophosphite, sulphamic acid, a sulphamate and/or an organophosphonic acid or salt thereof; and optionally (D) an alkali and/or alkaline earth metal oxide or hydroxide. and heating the mixture until a self sustaining exothermic reaction commences.

Normally the temperature of the mixture is allowed to rise from 60°C to at least 100°C with stirring to ensure adequate mixing and to prevent local overheating. Heat is then applied to raise the temperature to 135° – 160°C when an exothermic reaction takes place. As a result of this exothermic reaction the temperature rises to about 200°C and the products of the reaction are substantially in the form of a foam. Preferably A is employed in a molar proportion of from 1.3:1 to 3:1 and C in a molar proportion of from 2:1 to 1:10 based on the ($P_2O_5$) molar proportion. D is preferably employed in a minor proportion based on A.

In a preferred embodiment of the method of the invention the reaction is effected in an open reaction vessel adjacent to a collecting floor or collecting vessel. The components of the reaction mixture are added to the vessel in any order with stirring. The temperature is maintained below 130°C during an initial period, either by controlling the rate of addition or by cooling, and is then raised, or allowed to rise, above 135°–140°C until an exothermic reaction commences, and the reaction mixture is caused to foam out of the vessel onto the collecting floor or into a collecting vessel. The solid, friable, foamed product is readily recovered from the collecting floor and is easily crushed and bagged. This method represents a very easy and convenient method of obtaining the product with equipment of unusually low capital cost.

The preferred ingredient C is boric acid. Ammonium sulphate, sodium phosphite, sodium sulphite or sulphuric acid are also convenient for particular purposes. The reaction may be modified by using urea phosphate in place of at least part of reactants A and B. The product may be heat cured at temperatures between 150° and 250°C e.g. 180° to 210°C to form a relatively insoluble fire retardant.

The invention is illustrated by the following examples:

EXAMPLE I 355 parts by weight of urea were added to a mixture of 500 parts of tetraphosphoric acid and 92 parts of boric acid with stirring. Heat of neutralisation caused the temperature of the product to rise to 105°C. The mixture was further heated to 135°C whereupon an exothermic reaction took place and a dry foam of ammonium borophosphate was formed. The foam was uniform in composition and was easily broken and packed for storage.

The foam was amorphous to X-rays (corresponding ammonium polyphosphates are crystalline) and extremely rapidly soluble in water. 55 gms. dissolved in 50 gms. of water at 20°C. The product had a sequestering action on metallic ions when in solution and was stable to hydrolysis.

EXAMPLE 2

A liquid detergent was formulated as follows:

| | | |
|---|---|---|
| Product of example 1 | - | 10% (wt.) |
| Potassium xylene sulphonate | - | 10% |
| Coconut diethanolamide | - | 5% |
| Ammonia to | | pH 10 – 10.5 |

EXAMPLE 3

A mixture was made as in Example 1 additionally incorporating 72 gm. anhydrous sodium sulphite. On heating, a product was obtained of solubility 120 gm/100ml. water. The product was dried. It was more stable to storage than the Example 1 product despite its increased solubility. This improved product has similar applications to the Example 1 product, particularly where maximum solubility is required, and is suitable for incorporation in liquid fertiliser formulations.

EXAMPLE 4

A liquid fertilise was formulated by dissolving the following ingredients in order:

100 ml. water
25 gm. Potassium Chloride
100 gm. Urea, adjust to pH7 with ammonia solution
200 gm. Example 3 product
The liquid was clear, stable, of 18:23:2.4 NKP strength.

EXAMPLE 5

A mixture of 355 gms. Urea and 160 gms. ammonium sulphate powder was added slowly to 510 gm. warm phosphoric acid (82%w/w $P_2O_5$). The mixture was heated as in Example 1 and a firm dry product obtained. This material was roughly crushed, heated for 16 hours at 200°C, and finally ground to a fine powder.

This product was substantially insoluble with ammoniacal N:P ratio = 1.35:1 and was suitable for incorporation into intumescent paint formulations.

EXAMPLE 6

An intumescent paint was formulated as follows:

| | |
|---|---|
| Dicyandiamide | 10 gms. |
| Pentaerythritol | 22 gms. |
| Rutile (paint grade) | 12 gms. |
| Example 5 product | 56 gms. |
| Water | 40 gms. |

After 2 hours ball-milling 5 gms. of "Edifos B" (5% soln.) is added, followed by 42 gm. "Vinamul N9714".

EXAMPLE 7

A general purpose fire extinguisher powder suitable for class A, B and C fires, was formulated as follows:

| | |
|---|---|
| Example 5 product | 91 parts |
| "Neosyl" finely divided silica | 8 parts |
| "MS 11C7" silicone fluid | 1 part |

The product was ground until at least 80% passed 300 mesh.

EXAMPLE 8

1066 gms. urea was mixed with 132 gms. $NaH_2PO_3$ $5H_2O$ and the mixture added slowly to 1400 gms. tetraphosphoric acid. After reaction as in Example I the foamed product was cooled and easily crushed to a fine powder of solubility 15 gm/100 ml. water (20°C), 25 gm./100 ml. water (45°C), and sequestering power superior to that of sodium tripolyphosphate. It is, therefore, suitable for use in a domestic detergent where extreme solubility is not necessary.

What we claim is:

1. Modified ammonium polyphosphates having the formula $H_h$ $(NH_4)_n$ O $(PO_3)_p$ $(PO_2NH)_q$ $(BO_2)_b$ $(X)_x$ · $(H_2O)_y$, wherein X is at least one divalent group selected from $-(SO_3)-$, $-(SO_2)-$ and $-(HPO_2)-$, and $h, n, p, q, b, x$ and $y$ are all numbers from 0 to 20 which also comply with the following criteria: $p>2$; $p>q$; $(h+n) = (p+q+b+2)$; $(p+q)/(b+x)$ is from 1 to 100; and $n>o$; and $n>h$ which are water-soluble and contain at least one radical selected from the group consisting of borate, sulphate, sulphite, and phosphite produced by admixing component (i) an organic ammoniating and condensing agent, component (ii) a phosphoric acid, the molar proportion of said component (i) to said component (ii) based on the $P_2O_5$ content in said component (ii), being from 1.3:1 to 3:1, and component (iii) a compound selected from sulphuric acid, boric acid, boric oxide, phosphorous acid, sulphurous acid and the sodium potassium, calcium, urea and ammonium salts of said compound, the proportion of said component (iii) being from 2 to 1/10 moles per mole of $P_2O_5$ in the admixture; and heating until a self-sustaining exothermic reaction occurs whereby said three components react and form said water-soluble modified ammonium polyphosphates.

2. The modified ammonium polyphosphates of claim 1 wherein said component (i) is thiourea or urea; and said component (ii) is selected from the group consisting of phosphoric acid, or polyphosphoric acid containing up to 85% $P_2O_5$, or a suspension of $P_2O_5$ in polyphosphoric acid, and acid phosphate; and wherein said admixture is heated to between 130°C and 160°C until said exothermic reaction occurs.

3. The modified ammonium polyphosphates of claim 2 wherein component (iv), a compound selected from the group consisting of alkali metal oxides, alkali metal hydroxide, alkaline earth metal oxide, and alkaline earth metal hydroxide, in an amount less than component (i), is admixed and heated with said components (i), (ii) and (iii) until a self-sustaining exothermic reaction occurs whereby said four components react and form modified ammonium polyphosphates of the formula $H_h$ $M_{m/r}$ $(NH_4)_n$ O $(PO_3)_p$ $(PO_2NH)_q$ $(BO_2)_b$ $(X)_x$ · $(H_2O)_y$.

wherein M is a metal selected from the alkali metals and alkaline earth metals, $v$ is the valency of M, X is at least one divalent group selected from $\{SO_3\}$, $\{SO_2\}$ and $\{HPO_2\}$, and $h, m, n, p, q, b, x$ and $y$ are all numbers from 0 to 20 which also comply with the following criteria:

$p>2$; $p>q$; $(h+m+n) = (p+q+b+2)$; $n>m$; $(p+q)/(bb+x)$ is from 1 to 100; and $(m+n)>h$.

4. The modified ammonium polyphosphate of claim 3 containing from 40% to 70% by weight $P_2O_5$; having a nitrogen to phosphorus atomic ratio of from 1.3:1 to 2.5:1, and having a molar ratio of phosphate to the total of said borate, sulphate, sulphite, and phosphite from 1:1 to 20:1.

5. The modified ammonium polyphosphates of claim 4 wherein said component (iii) is one of the specified boron-containing compounds.

6. The modified ammonium polyphosphates of claim 4 wherein said component (iii) is one of the specified compounds containing sulphur in the sulphate form.

7. The modified ammonium polyphosphates of claim 4 wherein said component (iii) is one of the specified compounds containing sulphur in the sulphite form.

8. The modified ammonium polyphosphates of claim 4 wherein said component (iii) is one of the specified compounds containing phosphorus in the phosphite form.

9. The modified ammonium polyphosphates of claim 4 having a molar ratio of phosphate to the total of said borate, sulphate, sulphite, and phosphite of from 4:1 to 20:1.

10. The modified ammonium polyphosphates of claim 4 before having a molar ratio of phosphate to the total of said borate, sulphate, sulphite, and phosphite from 4:1 to 1:1.

11. Water-insoluble modified ammonium polyphosphates produced by heat curing the water-soluble modified ammonium polyphosphates of claim 1 at a temperature between 150°C and 250°C until a substantially water-insoluble product is formed.

12. Water-insoluble modified ammonium polyphosphates produced by heat curing the water-soluble modified ammonium polyphosphates of claim 4 at a temperature between 150°C and 250°C until a substantially water-insoluble product is formed.

13. Water-insoluble modified ammonium polyphosphates produced by heat curing the water-soluble modified ammonium polyphosphates of claim 5 at a temperature between 150°C and 250°C until a substantially water-insoluble product is formed.

14. Water-insoluble modified ammonium polyphosphates produced by heat curing the water-soluble modified ammonium polyphosphates of claim 6 at a temperature between 150°C and 250°C until a substantially water-insoluble product is formed.

15. Water-insoluble modified ammonium polyphosphates produced by heat curing the water-soluble modified ammonium polyphosphates of claim 7 at a temperature between 150°C and 250°C until a substantially water-insoluble product is formed.

16. Water-insoluble modified ammonium polyphosphates produced by heat curing the water-insoluble modified ammonium polyphosphates of claim 8 at a temperature between 150°C and 250°C until a substantially water-insoluble product is formed.

17. A process for preparing modified ammonium polyphosphates which comprises admixing component (i) an organic ammoniating and condensing agent, component (ii) a phosphoric acid, and component (iii) a compound selected from sulphuric acid, boric acid, boric oxide, phosphorous acid, sulphurous acid and the sodium, potassium, calcium, urea and ammonium salts of said compound, the proportion of said component (iii) being from 2 to 1/10 moles per mole of $P_2O_5$ in the admixture; and heating until a self-sustaining exothermic reaction occurs whereby said three components react and form water-soluble modified ammonium polyphates having the formula $$H_h\ (NH_4)_n\ O\ (PO_3)_p\ (PO_2NH)_q\ (BO_2)_b\ (X)_x \cdot (H_2O)_y.$$

wherein X is at least one divalent group selected from 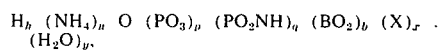, and $h, n, p, q, b, x$ and $y$ are all numbers from 0 to 20 which also comply with the following criteria:

$p>2$; $p>q$; $(h+n) = (p+q+b+2)$; $(p+q)/(b+x)$ is from 1 to 100; $n>o$; and $n>h$; and containing at least one of the groups selected from the group consisting of $BO_2$, $SO_3$, $SO_2$, and $HPO_2$.

18. The process of claim 17 wherein said component (i) is thiourea or urea; and said component (ii) is selected from the group consisting of phosphoric acid, or polyphosphoric acid containing up to 85% $P_2O_5$, or a suspension of $P_2O_5$ in polyphosphoric acid, and acid phosphate; and wherein said admixture is heated to between 130°C and 160°C until said exothermic reaction occurs.

19. The process of claim 18 wherein the molar proportion of component (i) to said $P_2O_5$ is between 1.3:1 and 3:1.

20. The process of claim 19 wherein said water-soluble modified ammonium polyphate formed as the product of said self-sustaining exothermic reaction is heated at a temperature between 150°C and 250°C until a substantially water-insoluble product is formed.

21. The process of claim 19 wherein said component (i) urea, and said component (ii) is selected from condensed phosphoric acids and suspensions of $P_2O_5$ in condensed phosphoric acids.

22. The process of claim 21 wherein said component (iii) is boric acid.

23. The process of claim 21 wherein said component (iii) is sodium sulphite.

24. The process of claim 21 wherein said component (iii) is ammonium sulphate.

25. The process of claim 21 wherein said component (iii) is $NaH_2PO_3$.

26. The modified ammonium polyphosphate of claim 3 wherein M is sodium, potassium or calcium.

27. The process of claim 17 wherein component (iv) selected from the group consisting of alkaline earth metal oxide, and alkaline earth metal hydroxide, in an amount less than component (i), is admixed and heated with said components (i), (ii) and (iii) as set forth in claim 17; and wherein said modified ammonium polyphosphates are of the formula $$H_h\ M_{m/v}\ (NH_4)_n\ O\ (PO_3)_p\ (PO_2NH)_q\ (BO_2)_b\ (X)_x \cdot (H_2O)_y,$$

wherein M is a metal selected from the alkali metals and alkaline earth metals, $v$ is the valency of M, X is at least one divalent group selected from 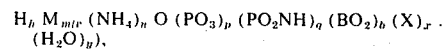, $-(SO_2)-$ and $-(HPO_2)-$, and $h, m, n, p, q, b, x$ and $y$ are all numbers from 0 to 20 which also comply with the following criteria:

$p>2$; $p>q$; $(h+m+n) = (p+q+b+2)$; $n>m$; $(p+q)/(b+X)$ is from 1 to 100; and $(m+n)>h$.

* * * * *